(12) United States Patent
Latorre et al.

(10) Patent No.: US 12,576,583 B2
(45) Date of Patent: Mar. 17, 2026

(54) MANUFACTURING SENSORS USING CELESTIAL BODY REGOLITH

(71) Applicant: University of Central Florida Research Foundation, Inc., Orlando, FL (US)

(72) Inventors: Perla Latorre, Orlando, FL (US); Seetha Raghavan, Orlando, FL (US); Quentin Fouliard, Orlando, FL (US)

(73) Assignee: University of Central Florida Research Foundation, Inc., Orlando, FL (US)

( * ) Notice: Subject to any disclaimer, the term of this patent is extended or adjusted under 35 U.S.C. 154(b) by 133 days.

(21) Appl. No.: 18/229,572

(22) Filed: Aug. 2, 2023

(65) Prior Publication Data

US 2024/0042685 A1 Feb. 8, 2024

Related U.S. Application Data

(60) Provisional application No. 63/394,908, filed on Aug. 3, 2022.

(51) Int. Cl.
| | |
|---|---|
| *B29C 64/165* | (2017.01) |
| *B29C 64/393* | (2017.01) |
| *B29K 101/10* | (2006.01) |
| *B29K 105/00* | (2006.01) |
| *B29K 105/16* | (2006.01) |
| *B29K 509/00* | (2006.01) |
| *B33Y 10/00* | (2015.01) |
| *B33Y 30/00* | (2015.01) |
| *B33Y 80/00* | (2015.01) |

(52) U.S. Cl.
CPC .......... *B29C 64/165* (2017.08); *B29C 64/393* (2017.08); *B29K 2101/10* (2013.01); *B29K 2105/16* (2013.01); *B29K 2105/251* (2013.01); *B29K 2509/00* (2013.01); *B33Y 10/00* (2014.12); *B33Y 30/00* (2014.12); *B33Y 80/00* (2014.12)

(58) Field of Classification Search
None
See application file for complete search history.

(56) References Cited

U.S. PATENT DOCUMENTS

2022/0009162 A1* 1/2022 Ballard .................. B33Y 10/00

OTHER PUBLICATIONS

Cloutis, E., et al. "LunaR: A Versatile Raman Spectrometer for Lunar Exploration." Lunar and Planetary Science Conference. No. 2548. 2021.

(Continued)

*Primary Examiner* — Yung-Sheng M Tsui
*Assistant Examiner* — Melody Tsui
(74) *Attorney, Agent, or Firm* — Troutman Pepper Locke LLP; Nicholas J. DiCeglie, Jr.; Gabrielle L. Gelozin

(57) ABSTRACT

A method can include additively manufacturing a sensor structure using a regolith of a celestial body. A sensor can be formed of additively manufactured celestial body regolith. A system for additively manufacturing sensors from celestial body regolith can include a spectrometer configured to receive and analyze regolith to produce regolith data, and an additive manufacturing machine associated with the spectrometer to receive the regolith data and to manufacture a sensor based on the regolith data to perform a predetermined sensor function.

7 Claims, 11 Drawing Sheets

| Volume Fraction % | Cup mass (g) | UV Resin (g) (expected) | UV Resin (g) (actual) | Regolith (g) (expected) | Regolith (g) (actual) | Cup+UVResin +Regolith (g) (before mixing) | Adapter+ Cup+UVResin +Regolith (g) (before mixing) | Mixing time (mins) | Defoaming (mins) |
|---|---|---|---|---|---|---|---|---|---|
| 20% | 4.501 | 38.5 | 38.85 | 13.65 | 13.7 | 57.04 | 96.125 | 9 | 3 |
| 20% | 4.479 | 38.5 | 38.22 | 13.65 | 13.678 | 56.4 | 95.47 | 6 | 0 |
| 20% | 4.71 | 38.5 | 38.55 | 13.65 | 13.5 | 56.78 | 95.87 | 6 | 0 |

(56)  References Cited

OTHER PUBLICATIONS

Mungas, Greg, et al. "Raman/CHAMP Instrument for Lunar In-situ Resource Prospecting I-Imager Design." 2007 IEEE Aerospace Conference. IEEE, 2007.

Robens, Erich, et al. "Investigation of surface properties of lunar regolith—Part IV." Annales Universitatis Mariae Curie-Sklodowska Lublin, Polonia, Sectio AA Chemia 63 (2008): 144-168.

McKay, D. S., Heiken, G., Basu, A., Blanford, G., Simon, S., Reedy, R., . . . & Papike, J. (1991). The lunar regolith. Lunar sourcebook, 567, 285-356.

Wang, A., Haskin, L. A., & Jolliff, B. L. (1995, March). Raman spectroscopy as a method for in-situ lunar mineralogical remote sensing. In Lunar and Planetary Science Conference (vol. 26).

Escobar-Cerezo, J., Muñoz, O., Moreno, F., Guirado, D., Martín, J. G., Goguen, J. D., . . . & West, R. A. (2018). An experimental scattering matrix for lunar regolith simulant JSC-1A at visible wavelengths. The Astrophysical Journal Supplement Series, 235(1), 19.

Baidya, S., Melius, M., Hassan, A. M., Sharits, A., Chiaramonti, A. N., Lafarge, T., . . . & Garboczi, E. J. (2021). Optical Scattering Characteristics of 3-D Lunar Regolith Particles Measured Using X-Ray Nano Computed Tomography. IEEE Geoscience and Remote Sensing Letters.

Gaier, J. R., Ellis, S., & Hanks, N. (2012). Thermal optical properties of lunar dust simulants. Journal of thermophysics and heat transfer, 26(4), 573-580.

\* cited by examiner

100

101

103

105

107

200

201

103

105

206a

206b

107

300

| Mineral/Material | Spectral | Properties Description |
|---|---|---|
| Pyroxene | Raman (cm^-1): 670, 1000 | Has luminescent properties |
| Olivine | Raman (cm^-1): 821, 851, 819, 854 | Thermoluminescent properties. Demonstrated varying intensities with different temperature values |
| SiO2 | Raman (cm^-1): 520 | Has demonstrated to have stress and temperature sensing capabilities |

Fig. 5

| Mineralogy Component | Wt.% | Raman Shift (cm-1) |
|---|---|---|
| Pyroxene | 32.8 | 682 |
| Glass-rich basalt | 32 | |
| Anorthosite | 19.8 | |
| Olivine | 11.1 | 823, 855 |
| Ilmenite | 4.3 | 681 |

Fig. 6

| Compound | Raman Shift (cm-1) |
|---|---|
| Albite (NaAlSi3O8) | 290, 506 |
| Anorthite (CaAl2Si2O8) | 503 |
| SiO2 | 520 |
| TiO2 | 143, 197, 241 |
| Fe2O3 | 226, 290, 409, 500, 615, 660, |

Fig. 7

| Oxide | Martian soil (Rieder et al., 1997) | Martian-simulated soil | Lunar soil 14163 (Morries et al., 1983) | Lunar-simulated soil |
|---|---|---|---|---|
| $SiO_2$ | 50.2 | 48.6 | 47.3 | 47.7 |
| $AU_2O_3$ | 8.4 | 8.2 | 17.8 | 15.0 |
| $TiO_2$ | 1.3 | 0.9 | 1.6 | 1.6 |
| $FeO_3$ | - | 19.8 | - | 3.4 |
| $FeO$ | 17.1 | - | 10.5 | 7.4 |
| $MnO$ | - | 0.3 | 0.1 | 0.2 |
| $CaO$ | 6.0 | 6.4 | 11.4 | 10.4 |
| $MgO$ | 7.3 | 7.1 | 9.6 | 9.0 |
| $K_2O$ | 0.5 | 0.6 | 0.6 | 0.8 |
| $Na_2O$ | 1.3 | 2.4 | 0.7 | 2.7 |
| $P_2O_5$ | - | 0.9 | 0.10 | 0.7 |
| $SO_3$ | 5.2 | 7.3 | - | - |
| $Cl$ | 0.6 | 0.7 | - | - |
| $Cr_2O_3$ | - | - | 0.2 | - |
| Others | - | - | - | 1.1 |

Fig. 8

| Volume Fraction % | Cup mass (g) | UV Resin (g) (expected) | UV Resin (g) (actual) | Regolith (g) (expected) | Regolith (g) (actual) | Cup+UVResin +Regolith (g) (before mixing) | Adapter+ Cup+UVResin +Regolith (g) (before mixing) | Mixing time (mins) | Defoaming (mins) |
|---|---|---|---|---|---|---|---|---|---|
| 20% | 4.501 | 38.5 | 38.85 | 13.65 | 13.7 | 57.04 | 96.125 | 9 | 3 |
| 20% | 4.479 | 38.5 | 38.22 | 13.65 | 13.678 | 56.4 | 95.47 | 6 | 0 |
| 20% | 4.71 | 38.5 | 38.55 | 13.65 | 13.5 | 56.78 | 95.87 | 6 | 0 |

Fig. 10

| Printing Parameters | Numerical Values |
| --- | --- |
| Exposure time (s) | 20 |
| Bottom exposure time (s) | 90 |
| Lift Distance (mm) | 5 |
| Lift speed (m/min) | 100 |
| Bottom Lifting Speed (mm/min) | 100 |
| Retract speed (mm/min) | 150 |
| Support Structures | Medium |
| DLP Material | Zyltech + regolith |
| Layer Height (mm) | 0.05 |
| Bottom Layer count | 8 |
| Light-off delay (s) | 12 |
| Bottom Light-off delay (s) | 12 |

Fig. 11

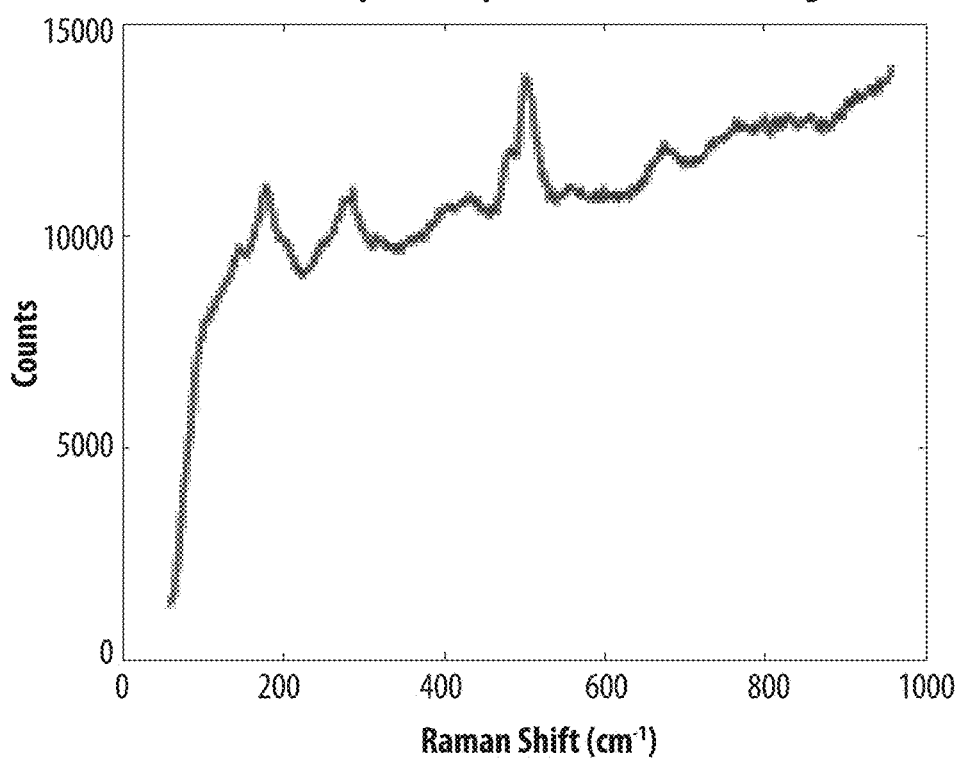
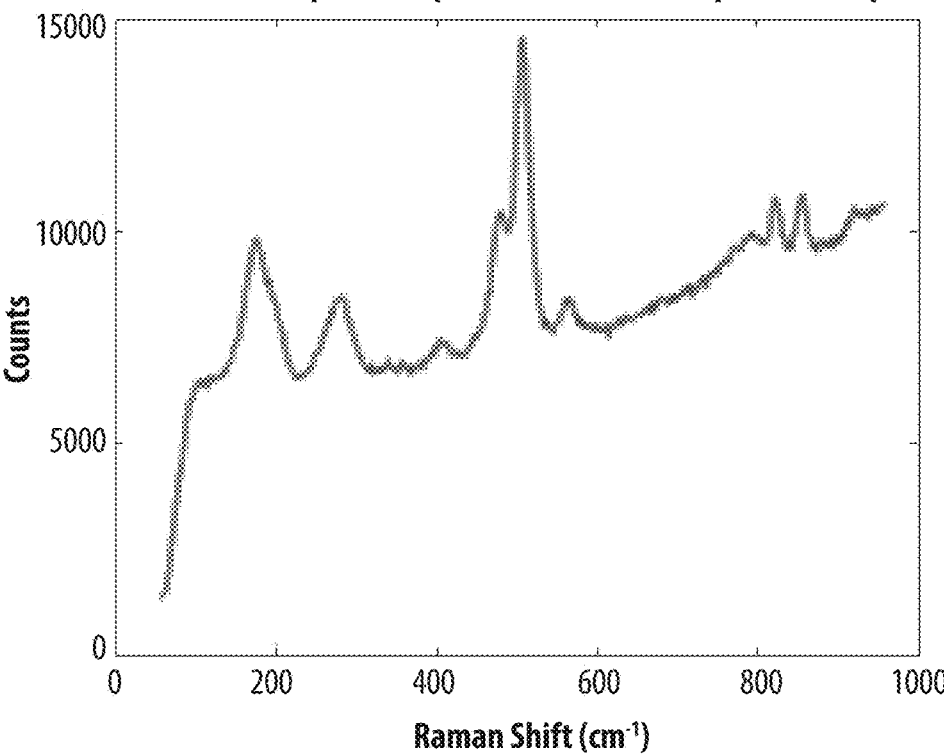
Fig. 13

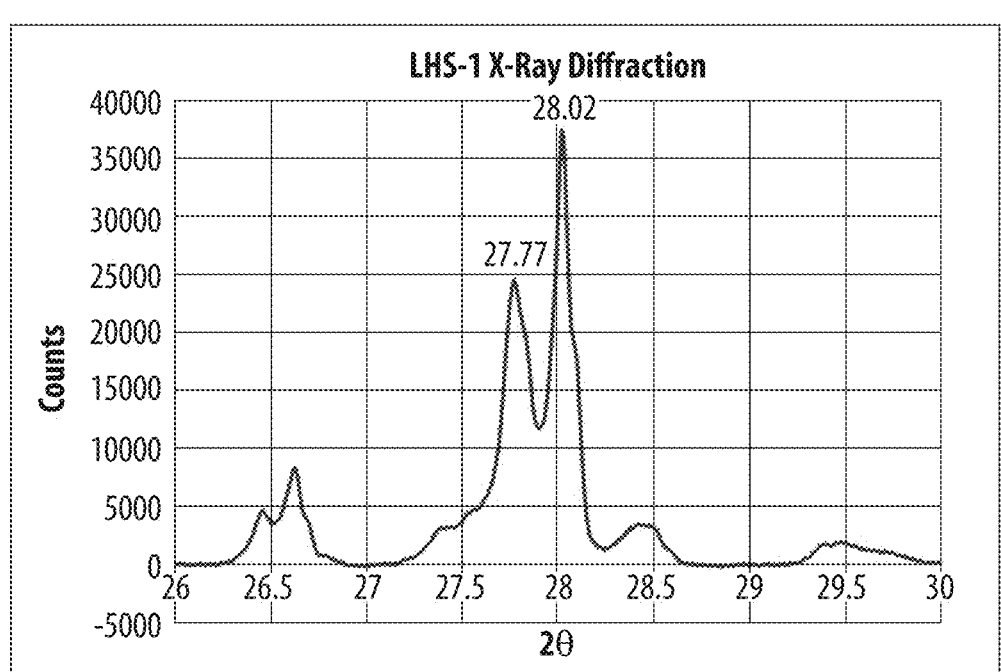
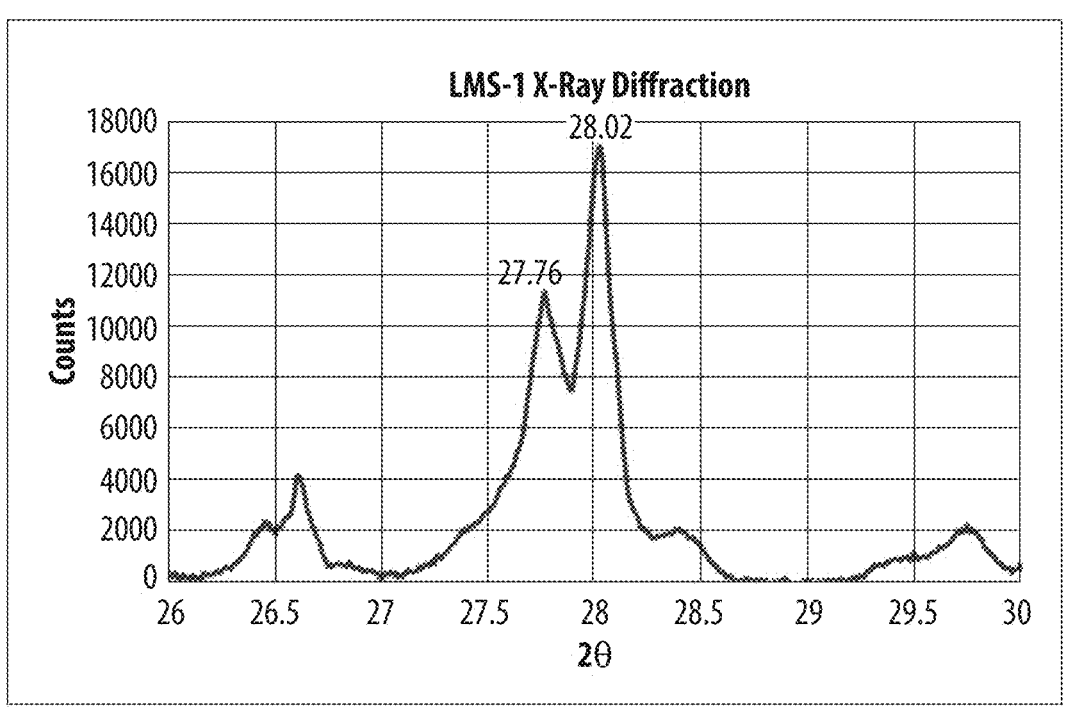
Fig. 14

MANUFACTURING SENSORS USING CELESTIAL BODY REGOLITH

CROSS-REFERENCE TO RELATED APPLICATIONS

This application claims priority to and the benefit of U.S. Provisional Application No. 63/394,908, filed Aug. 3, 2023, the entire contents of which are herein incorporated by reference in their entirety.

FIELD

This disclosure relates to manufacturing sensors using celestial body regolith.

BACKGROUND

In space exploration, devices that need to be used on a celestial body (e.g., the moon) must currently be carried from earth on spacecraft to the destination. This takes up space and reduces the amount of available payload for other resources.

Such conventional methods and systems have generally been considered satisfactory for their intended purpose. However, there is still a need in the art for improved methods for having needed devices at destination celestial bodies. The present disclosure provides a solution for this need.

SUMMARY

In accordance with at least one aspect of this disclosure, a method can include additively manufacturing a sensor structure using a regolith of a celestial body. In certain embodiments, the method further includes receiving regolith spectral analysis data of the regolith, determining one or more sensor functions achievable using the regolith based on the spectral analysis data, and operating an additive manufacturing machine to construct the sensor structure using the regolith to have the one or more sensor functions. In certain embodiments, the method further includes mixing celestial body regolith with resin or matrix to create an additive manufacturing medium, and additively manufacturing the sensor structure includes additively manufacturing the sensor structure layer-by-layer using the additive manufacturing medium.

In certain embodiments, the additive manufacturing medium can have a composition of about 20% regolith by volume or less. In certain embodiments, the method can include defoaming the additive manufacturing medium after mixing and before curing. In certain embodiments, the method can include selecting the regolith to include sensor properties. In certain embodiments, additively manufacturing can include defining the sensor structure to have a sensor shape.

In certain embodiments, the resin or matrix is UV resin. In certain embodiments, the composition of the additive manufacturing medium is about 1% to about 5% regolith by volume with the remainder being the resin. In certain embodiments, a particle size of the regolith is between about 10 microns to about 30 microns. In certain embodiments, the average particle size of the regolith is about 7 microns.

In certain embodiments, additively manufacturing includes digital light processing (DLP). In certain embodiments, the regolith is Lunar Mare regolith (LMS-1), and DLP printing parameters include one or more of a layer height setting that is about 0.05, an exposure time that is about 20 seconds, a lift distance of about 5 mm, a lift speed of about 100 mm/min, a bottom exposure time of about 90 seconds, and a retract speed of about 150 mm/min. In certain embodiments, the regolith is Lunar Mare Dust (LMS-1D) regolith or Lunar Highlands dust (LHD-1D) regolith, and DLP printing parameters include one or more of a layer height setting that is about 0.05, an exposure time that is about 6 seconds, a lift distance of about 5 mm, a lift speed of about 100 mm/min, a bottom exposure time of about 45 seconds, and a retract speed of about 150 mm/min.

In certain embodiments, the regolith is lunar regolith or Martian regolith, for example. Any other suitable celestial body regolith is contemplated herein.

In certain embodiments, the method can include using Raman spectroscopy or one or more other spectroscopy methods to compare peaks and/or other spectral properties with regolith data to design and verify sensing properties of the sensor structure.

In accordance with at least one aspect of this disclosure, a sensor can be formed of additively manufactured celestial body regolith. In certain embodiments, the celestial body regolith that forms the sensor can be lunar regolith or Martian regolith. In accordance with at least one aspect of this disclosure, a system for additively manufacturing sensors from celestial body regolith can include a spectrometer configured to receive and analyze regolith to produce regolith data, and an additive manufacturing machine associated with the spectrometer to receive the regolith data and to manufacture a sensor based on the regolith data to perform a predetermined sensor function.

These and other features of the embodiments of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein:

FIG. 5 is a table showing examples of materials in regolith, their associated spectral properties and a description of properties.

FIG. 6 is a table showing examples of regolith mineralogy components, a weight percent, and an associate Raman shift property.

FIG. 7 is a table showing examples of regolith compounds and an associate Raman shift property.

FIG. 8 is a table showing compositions of Martian soil, Martian simulated soil, Lunar soil, and Lunar simulated soil.

FIG. 10 is table showing example parameters of an embodiment of a mixing method in accordance with this disclosure.

FIG. 11 is a table showing an example of printing parameters in accordance with this disclosure.

FIG. 13 shows charts of Raman spectroscopy measurements of raw LMS-1 regolith (top) next to the Raman spectroscopy measurements of the experimental printed sensor structure (bottom).

FIG. 14 shows the graphs of results captured with lab-based diffraction of the lunar regolith simulants to determine the mineralogic composition.

Appendix A shows testing and data associated with one or more embodiments of this disclosure.

DETAILED DESCRIPTION

Figure 1:
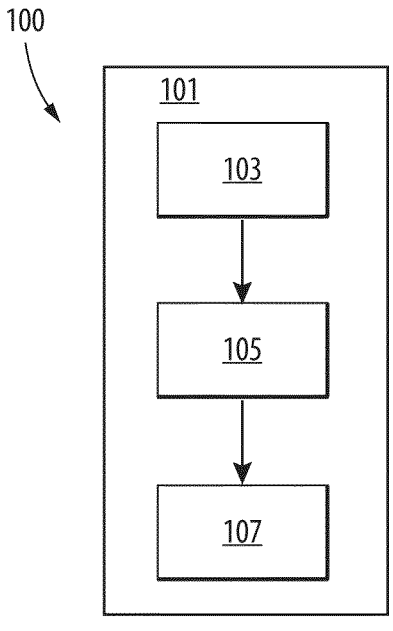
FIG. 1 is a block flow diagram of an embodiment of a method in accordance with this disclosure.

Reference will now be made to the drawings wherein like reference numerals identify similar structural features or aspects of the subject disclosure. For purposes of explanation and illustration, and not limitation, an illustrative view of an embodiment of a method in accordance with the disclosure is shown in FIG. 1 and is designated generally by reference character 100. Other embodiments and/or aspects of this disclosure are shown in FIGS. 2-14.

In accordance with at least one aspect of this disclosure, referring to FIG. 1, a method 100 can generally include additively manufacturing a sensor structure (e.g., block 101) using a regolith of a celestial body. In certain embodiments, the method further includes receiving (e.g., at block 103) regolith spectral analysis data (e.g., as described below) of the regolith, determining (e.g., at block 105) one or more sensor functions achievable using the regolith based on the spectral analysis data, and operating (e.g., at block 107) an additive manufacturing machine to construct the sensor structure using the regolith to have the one or more sensor functions.

Figure 2:
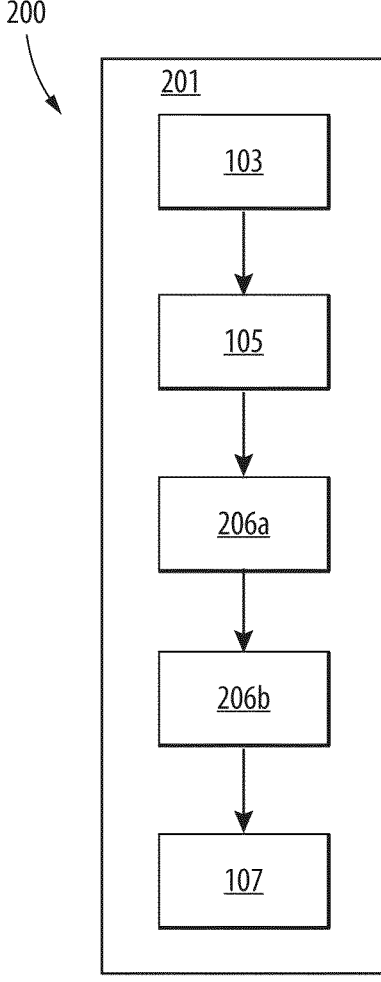
FIG. 2 is a block flow diagram of an embodiment of a method in accordance with this disclosure.

In certain embodiments, referring to FIG. 2, the method 200 can be similar to the method 100 of FIG. 1, and can further include mixing (e.g., at block 206a) celestial body regolith with resin or matrix to create an additive manufacturing medium. Additively manufacturing the sensor structure (e.g., block 201) can include additively manufacturing the sensor structure layer-by-layer using the additive manufacturing medium.

In certain embodiments, the additive manufacturing medium can have a composition of about 20% regolith by volume or less. In certain embodiments, the method 200 can include defoaming the additive manufacturing medium (e.g., at block 206b) after mixing regolith with resin or matrix and before curing (e.g., before layerwise manufacturing/energy application).

In certain embodiments, the method 100, 200 can include selecting the regolith to include sensor properties (e.g., after block 105 and before block 107). In certain embodiments, additively manufacturing 101, 201 can include defining the sensor structure to have a sensor shape.

In certain embodiments, the resin or matrix is UV resin. In certain embodiments, the composition of the additive manufacturing medium is about 1% to about 5% regolith by volume with the remainder being the resin. In certain embodiments, a particle size of the regolith is between about 10 microns to about 30 microns. In certain embodiments, the average particle size of the regolith is about 7 microns.

In certain embodiments, additively manufacturing includes digital light processing (DLP). In certain embodiments, the regolith is Lunar Mare regolith (LMS-1), and DLP printing parameters include one or more of a layer height setting that is about 0.05, an exposure time that is about 20 seconds, a lift distance of about 5 mm, a lift speed of about 100 mm/min, a bottom exposure time of about 90 seconds, and a retract speed of about 150 mm/min. In certain embodiments, the regolith is Lunar Mare Dust (LMS-1D) regolith or Lunar Highlands dust (LHD-1D) regolith, and DLP printing parameters include one or more of a layer height setting that is about 0.05, an exposure time that is about 6 seconds, a lift distance of about 5 mm, a lift speed of about 100 mm/min, a bottom exposure time of about 45 seconds, and a retract speed of about 150 mm/min.

In certain embodiments, the regolith is lunar regolith or Martian regolith, for example. Any other suitable celestial body regolith is contemplated herein.

In certain embodiments, the method can include using Raman spectroscopy, synchrotron x-ray diffraction, or one or more other spectroscopy methods to compare peaks and/or other spectral properties with regolith data to design and verify sensing properties of the sensor structure. For example, using Raman spectroscopy peaks for determining sensor qualities is further described below.

Figure 3:
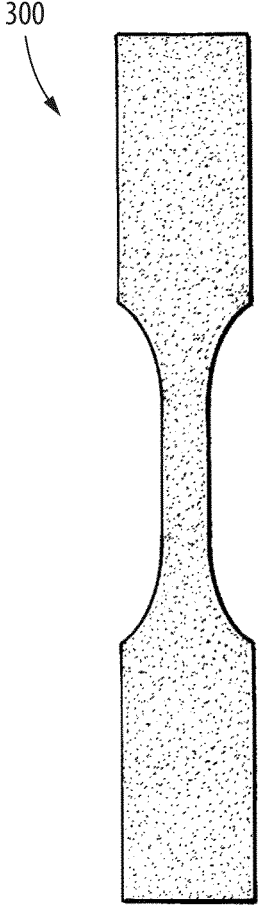
FIG. 3 is a plan view of an embodiment of a sensor structure in accordance with this disclosure.

In accordance with at least one aspect of this disclosure, referring to FIG. 3, a sensor 300 can be formed of additively manufactured celestial body regolith. In certain embodiments, the celestial body regolith that forms the sensor 300 can be Lunar regolith or Martian regolith. The sensor 300 as shown can be configured to sense strain/stress, for example. However, any suitable sensor function is contemplated herein.

Figure 4:
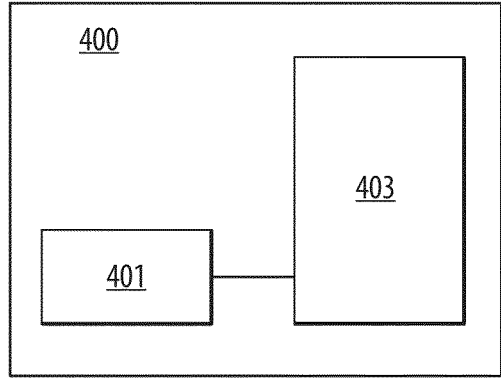
FIG. 4 is a schematic view of an embodiment of a system in accordance with this disclosure.

In accordance with at least one aspect of this disclosure, referring to FIG. 4, a system 400 for additively manufacturing sensors from celestial body regolith can include a spectrometer 401 configured to receive and analyze regolith to produce regolith data. The system 400 can also include an additive manufacturing machine 403 associated with the spectrometer to receive the regolith data and to manufacture a sensor based on the regolith data to perform a predetermined sensor function. The system 400 can be a rover, drone, or other suitable device configured to travel or exist on a celestial object, and/or to collect or be provided regolith for analysis and use (e.g., in accordance with one or more methods disclosed herein).

The development of the manufacturing process of the sensors using celestial body regolith is under continuous investigation. Celestial body materials and minerals can be studied with spectroscopic and high-energy x-ray diffraction techniques to determine the manufacturing parameters of the sensors. The manufacturing parameters include determining the particle size, volume fraction of the regolith or extracting the minerals from the regolith to be able to produce the technology using the sensing properties of each mineral. One having ordinary skill in the art is enabled to determine optimal volume fractions and particle size suitable to provide a desired sensing capabilities and suitable manufacturing processes for a desired sensor (e.g., having one or more applications during space exploration). One having ordinary skill in the art appreciates that experimentation to determine suitable properties of regolith and of the associated additive manufacturing process to achieve a desired result is not undue experimentation in view of this disclosure. In view of this disclosure, one having ordinary skill in the art knows how to determine sensing capabilities, for example, based on spectrometric information.

Figure 9:
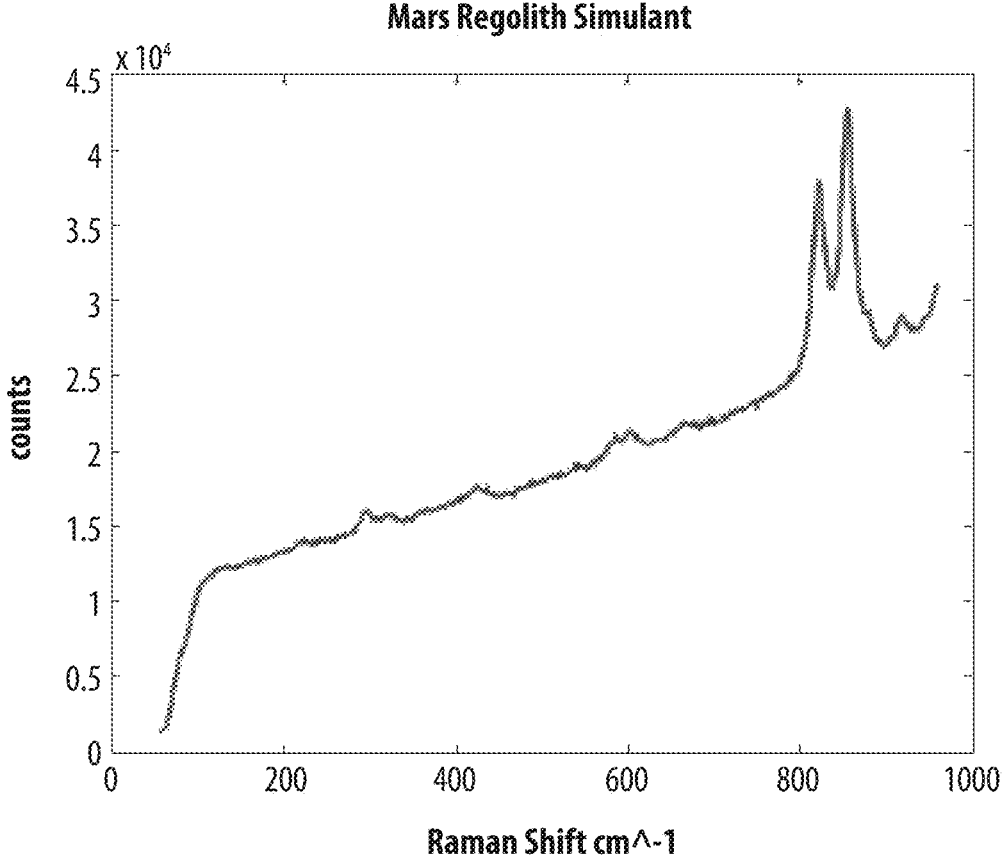
FIG. 9 is a chart of spectral properties of Mars regolith simulant, showing Raman shift.

For example, referring to FIGS. 5, 6, and 7, examples of material information relating to regolith is shown. As to FIG. 5, Raman lines of silicon at 520 cm^−1 are shifted by the application of stress. It was demonstrated that pressure in high-pressure experimental cells could be calibrated by the shift of the chromium fluorescence line from fine particles of ruby. It was also found that luminescence lines in chromium-doped sapphire were shifted by applied stress. The sharpness of fluorescence lines can depend on temperature and variations in the site position of the fluorescing atomic species. Referring to FIGS. 6 and 7, the tables show the expected peak positions for each mineral/chemical. FIG. 8 is a table showing compositions of Martian soil, Martian simulated soil, Lunar soil, and Lunar simulated soil. FIG. 9 shows a chart of spectral properties of Mars regolith simulant.

An example of a process used to make sample sensor structures is described below. The experimental mixing process used a THINKY™ mixer. The experimental process was as follows:

1. Weigh one THINKY™ cup on a mass balance and then zero out the mass.
2. Using a disposable pipette, add 38.5 g of ZYLtech™ UV resin into the THINKY™ cup. Record the actual mass of ZYLtech™ resin. Then, zero out the mass.
3. Using a lab spatula, add regolith (mass indicated in table from previous slide) into the THINKY™ cup. Record the actual mass of alumina. Then, zero out the mass.
4. Remove the THINKY™ cup from the mass balance, place it in the THINKY™ adapter, and then measure the total mass. Record the mass.
5. Place the THINKY™ adapter into the THINKY™ mixer. Adjust the dial to the mass recorded in STEP 4.
6. Close the lid of the THINKY™ mixer. Set the function to "MIXING". Then set the time to 3 minutes. Press "START" to mix.
7. Set the function to "DEFOAM". Then set the time to 3 minutes.
8. Once the THINKY™ is finished mixing and defoaming, open the THINKY™ and remove the adapter with the cup and mixture. Check the mixture. If contents of the mixture still appear separated, place the adapter with the cup and mixture and repeat Step 7 as many times as needed before proceeding to the next step.
9. Remove the adapter with the cup and mixture from the THINKY. Then, remove the cup from the adapter.

In this experiment, the THINKY™ MIXER maximum volume capacity was 50 cm 3 and the minimum volume capacity was 10 cm$^3$. The amount of mixture (e.g., liquid additive manufacturing medium) was enough to at least meet the printer's tank minimum volume. FIG. shows examiner parameters for the above mixing method of a 20% regolith volume fraction mixture.

Example sensor structures were then manufactured from mixtures produced above. Mixtures were made for 1 vol %, 5 vol %, and 20 vol % to test sensing properties and additive manufacturing parameters. 20 vol % of LMS-1 regolith mixed with the UV-resin was attempted first. The mean particle size was 50 μm and the particle size range was 0.04 μm-300 μm. The particles sedimented at the bottom of the mixture.

For 1 vol % and 5 vol % mixtures, the particle size was decreased, and this improved the matrix mixture. Less particle sedimentation was observed. The mean particle size was 7 μm for these mixtures and the particle size range was about <0.04-30 μm.

A DLP printing process was used. DLP process parameters for the experiment are shown in FIG. 11. Layer height was set at 0.05 mm and kept constant throughout the entire experiment. The samples were printed with an exposure time of 55 seconds. The bottom exposure time was 65 seconds to allow the first layer of the printed part to adhere to the build plate. The printer's resin tank volume range was 120 mL-260 mL. The ASTM D638-14 Standard Test Method for Tensile Properties of Plastics was used to manufacture the testing specimens.

After printing, the post printing process of the experimental sensor structures includes submersion in 70% isopropyl alcohol for 5 minutes and the resin residuals were removed. The samples were also exposed to a UV light source for 3 minutes on each side. This process was performed twice, with a total of 12 minutes.

Figure 12:
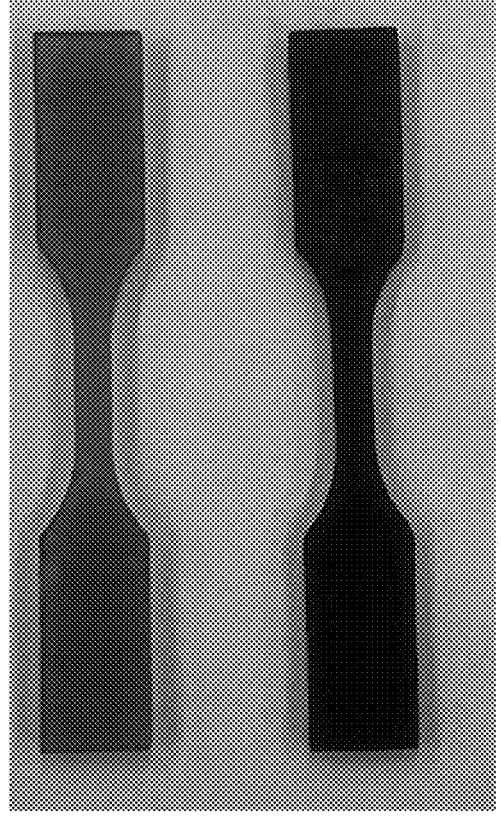
FIG. 12 is a plan view of experimental sensor structures having 1 vol % regolith (shown on left) and 5 vol % regolith (shown on right) in accordance with this disclosure.

FIG. 12 shows the printed 1 vol % sensor structure (left) and 5 vol % sensor structure (right). Raman data was collected on the printed samples to compare the peaks with previous experiments. FIG. 13 shows Raman spectroscopy measurements of the raw LMS-1 regolith (left) next to the Raman spectroscopy measurements of the experimental printed sensor structure. The Raman parameters for the experiment include 20× lenses, a map size of 3.69*2 points=7.39 points each axis, exposure time of 20 s, 22 minutes per map, and the scan was conducted on the rough side of the sample.

Experiments were conducted at the Argonne National Laboratory utilizing synchrotron x-ray diffraction to determine whether the minerals present in the regolith composition have sensing capabilities. FIG. 14 shows the graphs of results captured with lab-based diffraction of the lunar regolith simulants to determine the mineralogic composition. The synchrotron x-ray diffraction was performed with an energy of 59.38 kVe. Specimens with a cross-sectional area of 4×4 mm and a length of 12 mm were additively manufactured and compressively loading to a maximum load of 400 N while collection in-situ high energy x-ray diffraction data to measure the stress and any other effect on the regolith particles present in the specimen. The data collected with the synchrotron x-ray diffraction can be correlated with spectroscopic techniques such as piezospectroscopy and Raman spectroscopy to tailor its sensing capabilities. Such data allows one to determine the desired volume fraction of the regolith that should be added to collect strong signals to study the sensing properties of the material. Other parameters, such as particle size, may affect the sensing behavior of the regolith particles and may be studied with synchrotron x-ray diffraction data. One having ordinary skill in the art is enabled to collect such data without undue experimentation.

One having ordinary skill in the art can determine the desired composition and manufacturing process of the regolith sensors without undue experimentation. Other factors, such as the addition of other chemicals, compounds, or minerals, can be accounted for by one having ordinary skill in the art. Considering the possible multiple manufacturing processes of the regolith sensors, parameters such as resin compatibility, UV exposure, temperature, and particle size can be considered by one having ordinary skill in the art.

Due to the extensive mineralogic composition of the celestial regolith, minerals with sensing properties may be extracted to develop the sensors. Embodiments include technology used to manufacture the sensors in space conditions. The in-situ utilization of the lunar or celestial bodies' regolith allows for a decrease in the cargo needed during space missions. The development of the sensors using celestial body regolith allows the development of the sensors in space and provides specific information about the integrity of the components used during each mission as well as for the environment, such as gases, temperature, and pressure, surrounding the components.

Progress in space exploration activities has catalyzed a rapidly growing need to leverage in-situ resources during lunar and planetary missions. Regolith optical and sensing properties can be engineered and implemented as sensors to detect various properties including but not limited to temperature, pressure, stress, elemental quantity and dispersion. The various chemical compositions that make up lunar and planetary regolith contain elements that emit optical signals. When ingeniously engineered in specific forms and quantities, the optical signals can be harnessed to create functional sensors that monitor variables such as stress, temperature, and dispersion on the surfaces they are applied to. The configuration for creating such a sensor is non-trivial and correlates with multiple variables including composition of the primary sensing material, regolith-matrix quantities, particle size, bonding etc. that need to meet required conditions in order to produce a working sensor. As an example, lunar regolith contains silicon dioxide, the Raman signals of which can be effectively devised to capture stress and temperature by designing it with specific, defined parameters within a matrix material. Embodiments of design parameters and implementation approach disclosed herein, for example, enable creation of sensors. It has been demonstrated herein that the emission of Raman signals from Lunar simulants including the observation of a peak of silicon dioxide (520 cm^−1). Lunar and planetary regolith may also contain aluminum oxide, which have anticipated photoluminescent properties. Luminescence as well other optical and vibrational properties of regolith can be exploited to enable the creation of stress and temperature sensors. Due to its chemical composition, lunar and planetary regolith has the potential to be engineered to create sensors and certain embodiments entail the means for doing so.

The evolution of space exploration requires the development of materials using in-situ resources found on the surface of the Moon or other planets. It is planned to use in-situ resources for in-space manufacturing, construction, energy and oxygen production. In-space manufacturing of these resources can contribute to the reduction of payloads, fuel consumption, gas emission, as well as production costs on Earth. The elements and minerals found in the lunar regolith have optical and vibrational properties that can, in theory, be engineered as sensors to monitor stress, temperature, damage, and pressure. The development of sensors using lunar and planetary regolith can provide enabling technology for exploration efforts. Lunar regolith contains significant quantities of silicon dioxide that can be utilized for stress sensitivity. Lunar regolith also contains minerals such as olivine and albite that have thermoluminescence and photoluminescence properties which can be leveraged through innovative design for temperature and pressure measurements. Raman and luminescence measurements have been used to demonstrate the proof-of-concept certain embodiments for lunar regolith simulants. Relevant lunar regolith simulant has been designed and manufactured as a sensor for characterization in our laboratory to quantify and correlate Raman and luminescence response to stress, pressure, density, and temperature data. The sensors can be monitored by exciting the sensitive particles found in the regolith with a focused laser source, scanning the surface of the material to be probed for response to external stimuli such as load, pressure or temperature. The sensitivity measured from the elements can provide real-time and adaptive data. Embodiments allow for the design and integration of sensors and can control sensitivity and performance for effective sensing. The successful implementation of this technology can significantly increase system capabilities, safety operation and life cycle. This innovative solution can address the need for space processing and autonomy, as well as the need for real-time operations, cost, and complexity using in-situ resources from the lunar and planetary surfaces.

Embodiments can provide autonomous and integrated technology that allows for in-space material characterization to allow for critical measurements such as structural health monitoring, porosity, strength, or temperature is highly needed to ensure success and safety of space exploration missions. Regolith can be found in large amounts and various forms on the surface the Moon and is expected to be the main resource to produce oxygen and to build structures at the surface of our satellite. Using regolith that is readily available on-site is expected to reduce payload, and supply the medium to establish lunar bases, protect equipment and crews from radiation and temperature fluctuations, refuel spacecrafts and prepare for deep space exploration. Lunar and Planetary regolith possess well-known compositions that can potentially be designed, engineered and calibrated to act as a sensor. Measurements provided by this technology have tremendous potential to facilitate human exploration through in-situ characterization of structures covered (structural integrity) by regolith, temperatures, density (radiation protection, quality of regolith). Embodiments can use the transformation of the most abundant resource found on planetary and lunar surfaces to manufacture sensors that can support safe and efficient human exploration missions.

Embodiments can allow creation of sensors to be used for monitoring stress and temperature in outer planetary environments and extreme conditions. Sensors can be used to assess and measure characteristics of planetary/lunar vehicles, spacecrafts, landers, habitats, and exploration instruments.

Current measurement sensors for environmental/structural health monitoring technologies used on earth components requires a complex method of evaluation. The proposed environmental/structural health monitoring method can make use of in-situ resources in the lunar and planetary surfaces while ensuring safety. This method can reduce the developmental and operational costs for the sensors and the environmental/structural health monitoring. The method of manufacture can be simple enough to autonomously develop yet customizable for the materials obtained. The sensing approach is non-contact for minimal human intervention to achieve data collection.

Regolith is not strictly identical in composition across the surface of the Moon or other planetary surfaces. Regolith properties such as density, particle size distribution, thickness of the regolith change with extraction depth and location. The devising of a sensor configuration that optimally delivers a sensing mechanism is non-trivial. Certain embodiments utilize a multi-disciplinary knowledge in mechanics, optics and materials to achieve new and significant measurement capabilities. Embodiments can help to ensure safety and efficiency while monitoring the environmental exposure and structural cycle life of the components and vehicles used in lunar and planetary surfaces. Embodiments can include a space exploration device that includes integration of a manufacturing device or 3D printer that can operate in space environments.

The term "celestial body" as used herein means any suitable extraterrestrial body (extraterrestrial meaning not including Earth). For example, the term celestial body includes, but is not limited to, planets (e.g., Mars), moons (e.g., the moon), asteroids, comets, or any other natural space object having regolith.

Embodiments can include any suitable computer hardware and/or software module(s) to perform any suitable function (e.g., as disclosed herein). For example, a system can include an additive manufacturing system configured to perform a method as disclosed herein (e.g., selecting regolith based on composition, mixing regolith with a resin or matrix, and additively manufacturing a sensor component) autonomously and/or with manual control.

Embodiments can include methods and systems configured to manufacture sensors using the properties from the lunar and other planetary regolith. The sensors can have the ability to sense and monitor effects from the components that will be used for lunar exploration.

Embodiments include a manufacturing process for sensors to develop the sensors to monitor the devices and structures that will be used in space. Space exploration has been evolving, where structures and stations will be built at the lunar surface, for example. The regolith can be used at a lunar base, for example, for sensor components due to the properties that it possesses. The method can include determining optical properties of regolith for a particular sensor, and additively manufacturing a functional sensor from the regolith based on the optical properties of the regolith.

In certain additive manufacturing methods, the maximum volume percentages for regolith vs resin or matrix or other binder medium can change as a function of several variables (e.g., composition, particle size, sensor type/function, etc.). Certain embodiments can have a 20% maximum volume fraction, however, any other suitable fraction to result in a desired sensor function and/or form factor is contemplated herein. In certain embodiments, particle size for such a volume fraction can have a range of 0 to 1000 microns and a median particle size of 88 microns. Any other suitable particle size and volume fraction for a desired sensor function is contemplated herein.

Embodiments can include methods and systems for characterizing regolith as a sensor using optical analysis. For example, embodiments can include collecting regolith and determining one or more material properties for use as a sensor, e.g., using spectral analysis. Embodiments can include determining what type of sensor the regolith can be used to make based on the one or more material properties. Embodiments can include making a sensor with the regolith based on the one or more material properties such that the sensor has a predetermined sensing function.

Embodiments can be made with any suitable additive manufacturing method with any suitable other medium/resin or matrix. For example, embodiments can use a UV resin, for example. Other mixing agents such as epoxy can be used, for example.

As will be appreciated by those skilled in the art, aspects of the present disclosure may be embodied as a system, method or computer program product. Accordingly, aspects of this disclosure may take the form of an entirely hardware embodiment, an entirely software embodiment (including firmware, resident software, micro-code, etc.), or an embodiment combining software and hardware aspects, all possibilities of which can be referred to herein as a "circuit," "module," or "system." A "circuit," "module," or "system" can include one or more portions of one or more separate physical hardware and/or software components that can together perform the disclosed function of the "circuit," "module," or "system", or a "circuit," "module," or "system" can be a single self-contained unit (e.g., of hardware and/or software). Furthermore, aspects of this disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of this disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of this disclosure may be described above with reference to flowchart illustrations and/or block diagrams of methods, apparatus (systems) and computer program products according to embodiments of this disclosure. It will be understood that each block of any flowchart illustrations and/or block diagrams, and combinations of blocks in any flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in any flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified herein.

Those having ordinary skill in the art understand that any numerical values disclosed herein can be exact values or can be values within a range. Further, any terms of approximation (e.g., "about", "approximately", "around") used in this disclosure can mean the stated value within a range. For example, in certain embodiments, the range can be within (plus or minus) 20%, or within 10%, or within 5%, or within 2%, or within any other suitable percentage or number as appreciated by those having ordinary skill in the art (e.g., for known tolerance limits or error ranges).

The articles "a", "an", and "the" as used herein and in the appended claims are used herein to refer to one or to more than one (i.e., to at least one) of the grammatical object of the article unless the context clearly indicates otherwise. By way of example, "an element" means one element or more than one element.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of."

Any suitable combination(s) of any disclosed embodiments and/or any suitable portion(s) thereof are contemplated herein as appreciated by those having ordinary skill in the art in view of this disclosure.

The embodiments of the present disclosure, as described above and shown in the drawings, provide for improvement in the art to which they pertain. While the subject disclosure includes reference to certain embodiments, those skilled in the art will readily appreciate that changes and/or modifications may be made thereto without departing from the spirit and scope of the subject disclosure.

What is claimed is:

1. A method, comprising additively manufacturing a sensor structure using a regolith of a celestial body, the method comprising:
   generating a printing material, comprising:
      introducing an amount of UV resin into a container;
      introducing an amount of regolith or regolith simulant into the container;
      mixing the UV resin and regolith within the container forming a mixture; and
      defoaming the mixture, wherein the mixture includes 1 vol %, 5 vol %, or 20 vol % of regolith and wherein a particle size range was 0.04 μm-300 μm; and
   introducing the printing material into a digital light processing (DLP) printer; and
   printing the test structure using the DLP printer, wherein a layer height is 0.05 mm, an exposure time for a first layer 65 seconds and an exposure time for each subsequent later after the first layer is 55 seconds.

2. The method of claim 1, wherein additively manufacturing includes defining the test structure to have a dumbbell shape.

3. The method of claim 1, wherein the regolith is Lunar Mare regolith (LMS-1).

4. The method of claim 1, wherein the regolith is Lunar Mare Dust (LMS-1D) regolith or Lunar Highlands dust (LHD-1D) regolith.

5. The method of claim 1, wherein the regolith is lunar regolith or Martian regolith.

6. The method of claim 1, further comprising using Raman spectroscopy or other spectroscopy methods to compare peaks and other spectral properties with regolith data to design and verify sensing properties of the sensor structure.

7. A method of forming a test structure, comprising:
   forming a printing material, comprising:
      placing a THINKY™ cup on a mass balance;
      adding 38.5 g of Zyltech™ uv resin into the THINKY™ cup, recording the actual mass of Zyltech™ resin;
      adding an predetermined amount of regolith simulant into the THINKY™ cup forming a resin-regolith mixture so that the regolith is 1 vol %, 5 vol %, or 20 vol % of the resin-regolith mixture, recording an actual mass of alumina in the resin-regolith mixture;
      removing the THINKY™ cup from the mass balance, placing the THINKY™ cup in a THINKY™ adapter, measuring a total mass; and recording the total mass;
      placing the THINKY™ adapter into a THINKY™ mixer and adjusting a mixing setting of the THINKY™ mixer to correspond to the total mass;
      selecting a mix function on the THINKY™ mixer and operating the THINKY™ mixer for three minutes to mix the resin-regoliths mixture;

selecting a defoam function on the THINKY™ mixer and operating the THINKY™ mixer for three minutes to defoam the mixture;

removing the THINKY™ adapter from the THINKY™ mixer and removing the THINKY™ cup from the THINKY™ adapter, wherein a mean particle size for the regolith particles in the resin-regolith mixture and a particle size range for the regolith particles in the resin-regolith mixture is determined as a function of the vol % of regolith in the resin-regolith mixture, wherein:

for a 20 vol % regolith a mean particle size of the regolith particles is 50 μm and a particle size range for the regolith particles is 0.04 μm-300 μm for a 1 vol % and a 5 vol % mixtures, a mean particle size of the regolith particles is 7 μm and a particle size range for the regolith particles is about <0.04-30 μm; and printing the test structure, comprising:

introducing the printing material into a digital light processing (DLP) printer; and printing the test structure using the DLP printer, wherein a layer height is 0.05 mm, an exposure time for a first layer 65 seconds and an exposure time for each subsequent later after the first layer is 55 seconds.

\* \* \* \* \*